United States Patent [19]
Takayama et al.

[11] Patent Number: 4,939,596
[45] Date of Patent: Jul. 3, 1990

[54] INFORMATION SIGNAL RECORDING AND REPRODUCING APPARATUS

[75] Inventors: Nobutoshi Takayama; Isao Harigaya; Kenichi Nagasawa, all of Kanagawa, Japan

[73] Assignee: Canon Kabushiki Kaisha, Tokyo, Japan

[21] Appl. No.: 15,959

[22] Filed: Feb. 18, 1987

Related U.S. Application Data

[64] Division of Ser. No. 816,977, Jan. 9, 1986, Pat. No. 4,675,753, which is continuation of Ser. No. 529,965, Sept. 7, 1983, abandoned.

[30] Foreign Application Priority Data

Sep. 10, 1982 [JP] Japan .................................. 57-158372
Sep. 10, 1982 [JP] Japan .................................. 57-158373
Sep. 10, 1982 [JP] Japan .................................. 57-158374
Sep. 13, 1982 [JP] Japan .................................. 57-160161

[51] Int. Cl.$^5$ .......................... G11B 5/02; G11B 15/18
[52] U.S. Cl. ....................................... 360/27; 360/69; 360/71

[58] Field of Search ................... 360/27, 14.2, 73, 69, 360/71

[56] References Cited

U.S. PATENT DOCUMENTS 4,675,753 6/1987 Takayama et al. .................. 360/27

Primary Examiner—Vincent P. Canney
Attorney, Agent, or Firm—Robin, Blecker & Daley

[57] ABSTRACT

Disclosed is an information signal recording and reproducing apparatus which comprises first recording means for recording an information signal on a recording medium; first reproducing means for reproducing the information signal from the recording medium; second recording means for recording a control signal on the recording medium (the control signal corresponding to an optional quantity of the information signal); second reproducing means for reproducing the control signal from the recording medium; and control means for controlling the reproducing action of said first reproducing means in response to the control signal reproduced by said second reproducing means.

3 Claims, 10 Drawing Sheets

INFORMATION SIGNAL RECORDING AND REPRODUCING APPARATUS

This is a division of application Ser. No. 816,987, filed Jan. 9, 1986, now U.S. Pat. No. 4,675,753 which in turn is a continuation of Ser. No. 529,965, filed Sept. 7, 1983, now abandoned.

BACKGROUND OF THE INVENTION

1. Field of the Invention:

This invention relates to an information signal recording and reproducing apparatus and more particularly to an information signal recording and reproducing apparatus of the kind arranged to record a signal for controlling the apparatus on a recording medium used for recording information signals.

2. Description of the Prior Art:

In this specification, magnetic recording and reproducing apparatuses, or video tape recorders, of the kind arranged to record a video signal as an information signal on a magnetic tape by means of rotating heads (hereinafter will be called VTR for short) will be taken as an example of information signal recording and reproducing apparatuses.

VTR's of the type contrived to permit so-called varied speed reproduction in which reproduction of records from magnetic tapes by allowing the tapes to travel at different speeds from the speed used in recording have become popular during recent years. Technique required for varied speed reproduction also has advanced even in the field of home VTR's. As a result, there have been developed some improved home VTR systems that are capable of precluding noise bars from appearing on reproduced pictures obtained even by varied speed reproduction carried out by allowing the tape to travel at a different speed from the standard reproduction speed, such as in the case of high speed search reproduction, slow motion reproduction, still picture reproduction, etc. These improved systems include, for example, a system using a dynamic tracking method in which rotating video heads are deflected by means of piezo-electric elements or the like; a system using double azimuth heads; etc. With these systems employed, special reproduction pictures have become obtainable in high quality. As a result of this, varied speed reproduction facilities provided in VTR's have come to be more often used.

With repect to recording on the other hand, a continuous recording oepration over a long period of time has become possible. Hence, it has become a popular practice to continuously record many scenes on a signal piece of recording tape and to have some of these recorded scenes selectively reproduced later as desired. In that event, the user has been required to find out each of desired parts of the record from the tape and to operate the apparatus by selecting the reproduction mode thereof for each desired part. Such searching and selecting operations on a long-recording-time tape has been troublesome. To simplify the searching process for finding a desired scene recorded, therefore, VTR's which are capable of automatically searching out the initial part of each desired record have been developed. In the VTR having this feature, an indexing or search-out signal is recorded at a part of the recording medium corresponding to the initial part of every record during a recording operation. During a reproducing operation, the apparatus is stopped when this signal is reproduced and then the apparatus is set into a normal reproducing mode. In the search-out mechanism of the prior art, however, the apparatus is merely brought to a stop and into a standard reproduction mode after a desired initial part is set in place. With that mechanism employed for the search-out purpose, the apparatus is set into the standard reproduction mode every time a record starting part is found. Then, if this record starting part is not that of a desired scene, the search operation must be repeatedly performed until a desired scene is found. Therefore, it has been not only time consuming but also troublesome to find out a picture out of a magnetic tape of long recording time. It has been especially troublesome where many short scenes are recorded on the tape as the apparatus must repeatedly come back to the standard reproduction mode every time the initial part of each scene is found.

Conversely, where the length of each record is long, there is high probability that a desired scene is recorded in a part far away from the initial part of each record and the desired scene cannot be readily found through a search operation. Arrangement to avoid this trouble by making each record short then comes back to the above-stated troublesome search-out operation.

Further, in accordance with the prior art VTR's, in cases where a desired scene is to be reproduced by a reproduction mode other than the standard reproduction mode (for example, by varied speed reproduction), the apparatus must be stopped once after a search-out process and then the apparatus must be set once again into the desired reproduction mode. Such operation has been also quite troublesome.

SUMMARY OF THE INVENTION

In view of the above-stated shortcomings of the prior art, it is an object of the present invention to provide an information signal recording and reproducing apparatus which enables the operator to promptly take out desired information without any troublesome operation.

It is another object of the invention to provide an information signal recording and reproducing apparatus which enables the operator to freely take out a desired recorded signal from records even when the desired signal is not located in the initial part of the record.

It is a further object of the invention to provide an information signal recording and reproducing apparatus which enables the operator to reproduce a desired information signal in a desired reproducing operation mode.

These and further objects and features of the invention will become apparent from the following detailed description of preferred embodiments thereof taken in conjunction with the accompanying drawings.

BRIEF DESCRIPTION OF THE DRAWINGS

FIG. 7A through E is a timing chart showing the wave form of each part shown in FIG. 5.

FIG. 8J through VI is a timing chart showing the wave form of each part shown in FIG. 6.

DETAILED DESCRIPTION OF PREFERRED EMBODIMENTS

Figure 1:
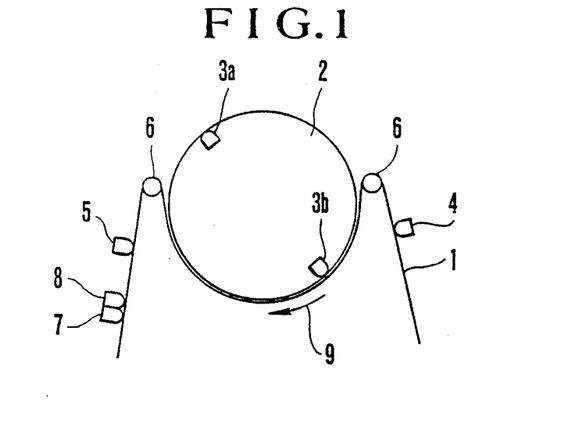
FIG. 1 schematically shows a tape transport system of a VTR as an embodiment of the present invention.
Figure 2:
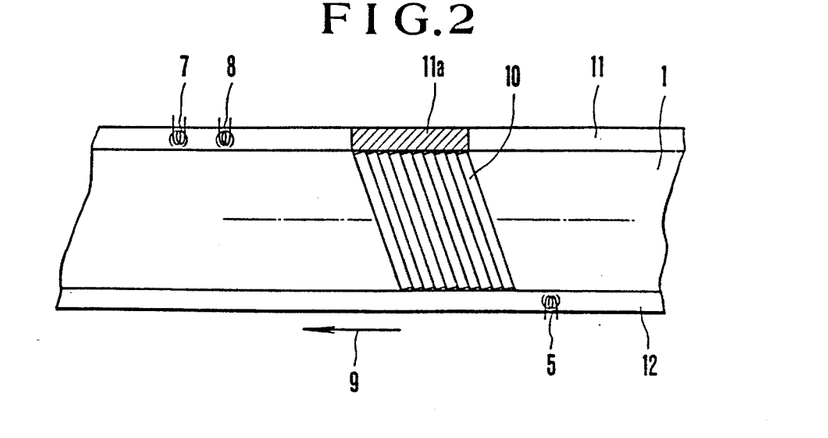
FIG. 2 schematically shows recording loci drawn on a magnetic tape by a VTR according to the invention.

FIG. 1 shows the tape transport system of a VTR according to the present invention as an embodiment thereof and FIG. 2 a recording pattern drawn by the VTR on a magnetic tape. These drawings show a magnetic tape 1, a rotating drum 2, recording and reproducing heads 3a and 3b which are provided for recording and reproducing a video signal as an information signal; an erasing head 4 which is provided for erasing records over the whole width of the magnetic tape 1; an audio head 5 which is provided for recording and reproducing an audio signal; extracting pins 6 for winding the magnetic tape 1 round the rotating drum 2; another head 7 which is provided for recording and reproducing a mode control signal; an erasing head 8 for erasing the mode control signal; and an arrow 9 which indicates the travelling direction of the magnetic tape 1.

The recording and reproducing heads 3a and 3b record a video signal while forming oblique recording tracks 10. Meanwhile, the audio head 5 records an audio signal in an audio track 12. Further, the head 7 records in a track 11 a mode control signal relative to the reproducing operation mode of the apparatus.

Figure 3:
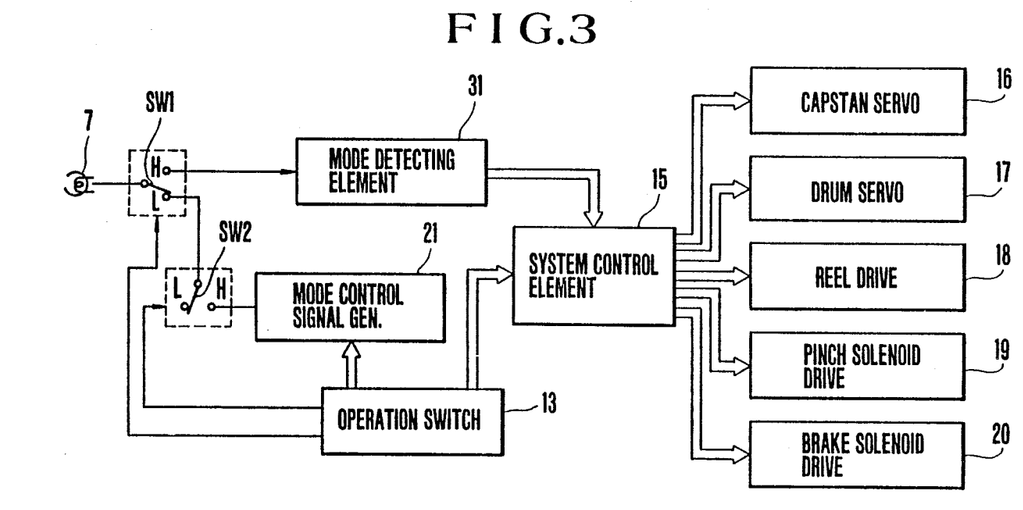
FIG. 3 is a block diagram showing the basic arrangement of a VTR as an embodiment of the invention.

The basic arrangement of this VTR according to the invention is as shown in FIG. 3. An operation switch 13 and a system control element 15 which are shown in FIG. 3 are arranged as shown by way of example in FIg. 4. A mode control signal generator 21 which is shown in FIG. 3 is arranged as shown by way of example in FIG. 5. A mode detection element 31 which is shown in FIG. 3 is arranged as shown by way of exdample in FIG. 6.

Figure 4:
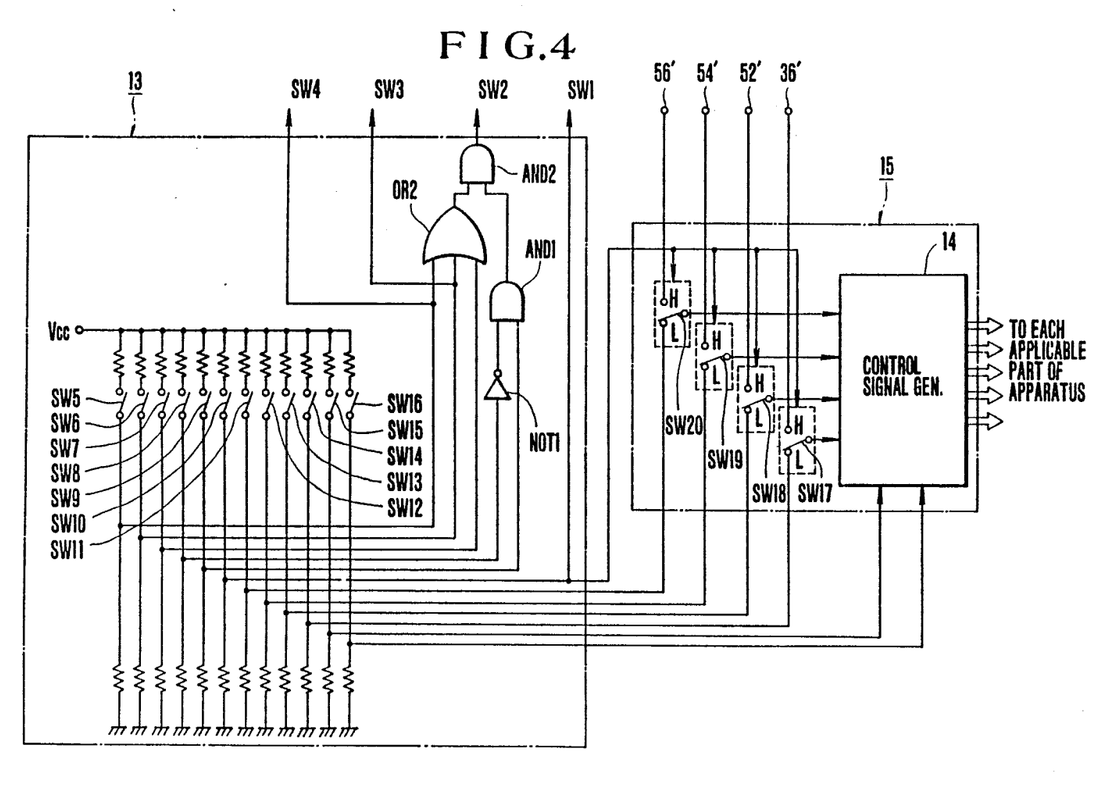
FIG. 4 is a circuit diagram showing an operation switch and a system control element used in the VTR shown in FIG. 3.
Figure 5:
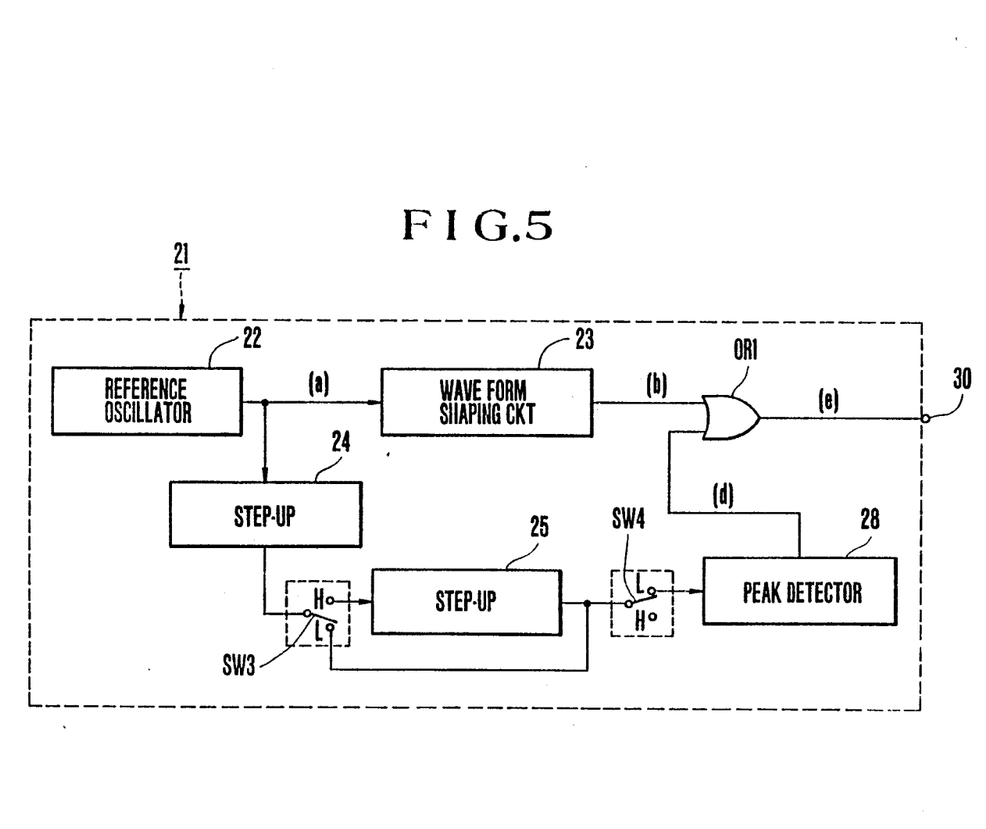
FIG. 5 is a block diagram showing by way of example a mode control signal generator used in the VTR shown in FIG. 3.

Referring now to FIG. 4, a group of switches SW5-SW16 are arranged to open and close according as the operation switch 13 of the VTR is operated by the user. When a mode control signal is recorded, the switches SW5-SW8 designate a reproducing operation mode corresponding to the recorded mode control signal. The switch SW9 is arranged to instruct recording of the mode control signal. The switch SW10 is arranged to instruct reproduction of the mode control signal recorded in the track 11 (hereinafter this reproduction will be called control reproduction). The switch SW11 instructs a high speed searching reproducing operation. The switch SW12 instructs a slow motion reproducing operation. The switch SW13 instructs a standard reproducing operation. The switch SW14 instructs a quick feeding. The switch SW15 instructs rewinding. The switch SW16 instructs recording of a video signal. Although not shown, the seven switches SW10-SW16 are either mechanically or electrically arranged in such a manner that when one switch turns on, other switches turn off. The four switches SW5-SW8 are also arranged likewise.

With the VTR arranged as described above, it operates as follows when a video signal is to be recorded: The switch 16 within the opertion switch 13 is turned on to instruct recording of a video signal. Then, the switch SW1 which is shown in FIG. 3 is connected to one side L thereof. This is because the switch SW10 is off with the switch SW16 turned on and, accordingly, a low level control signal is supplied to the switch SW1 as shown in FIG. 4 (Further, in FIG. 3, the switch 1 is shifted to one side H when the level of the control signal is high and to the other side L when the level of the signal is low.) In the case of recording a video signal alone, the switch SW9 is off. The output level of an AND gate AND1 becomes low. Accordingly, the output level of an AND gate AND2 also becomes low. As a result of that, another switch SW2 is shifted to one side L thereof.

Further, a signal instructing video signal recording is supplied to a control signal generator 14 of the system control element 15. The control signal generator 14 supplies a control signal to each applicable part of the apparatus in accordance with the mode designated by the operation switch 13 or by the mode detection element 31. In this instance, the recording and reproducing heads 3a and 3b record a video signal which has been transformed by a signal processing system which is not shown into a signal form suited to recording. Meanwhile, an audio signal is recorded by the audio head 5.

Again referring to FIG. 3, the VTR system includes a servo system circuit 16 for a capstan which is arranged to cause a magnetic tape 1 to travel; another servo system circuit 17 which is for the rotating drum 2; a reel drive circuit 18 provided for driving a supply reel on which the magnetic tape is would and a take-up reel, though these reels are not shown; a pinch solenoid drive circuit 19 arranged to bring a pinch roller and the capstan which are not shown into pressed contact with each other and to separate them from each other; and a brake solenoid drive circuit 20 which is arranged to bring the supply and take-up reels to a stop.

Next, in case that a mode control signal is to be recorded in the track 11 during a video signal recording operation, the embodiment operates as follows: The switch SW9 turns on while the video signal is being recorded. Then, the switch SW9 instructs recording of the mode control signal. As a result, the mode control signal which corresponds to each mode is recorded in the track 11. However, in case where a quick feeding mode is to be designated, the switch SW8 turns on. This causes the output level of an inverter NOT1 to become low. Accordingly, the output levels of both the AND gates AND1 and AND2 become low. The switch SW2 is shifted to the side L. Therefore, the mode control signal is not recorded. This means that the absence of any mode control signal in the track 11 is equivalent to recording a mode control signal corresponding to the quick feeding mode.

Among the switches SW5–SW8, when any of them other than the switch SW8 is turned on, the output level of the AND gate AND1 and that of an OR gate OR2 both become high. This causes the output level of the AND gate AND2 to become high and the switch SW2 is shifted to the side H thereof. With the switch SW2 sshifted to the side H, the head 7 comes to record a mode control signal produced by a mode control signal generator 21 in the track 11.

Figure 7:
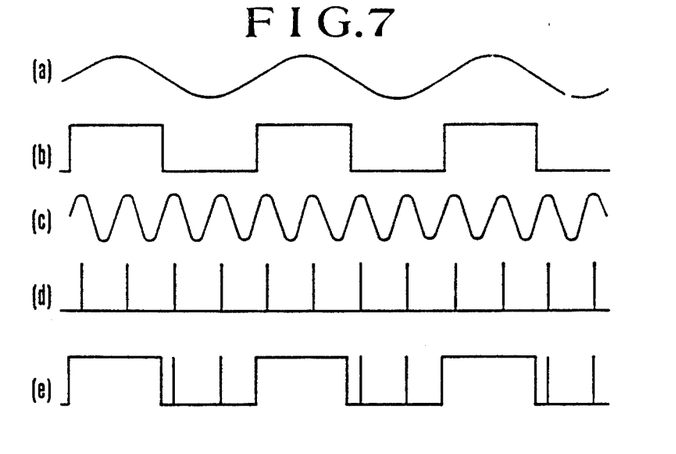

The operation of the mode control signal generator 21 is as follows: FIG. 7 shows the wave forms of outputs (a)–(e) of elements shown in FIG. 5 obtained when the mode control signal generator 21 is caused by turning on the switch SW6 of FIG. 4 to produce a mode control signal corresponding to a high speed searching operation mode. In FIG. 7, a wave form (a) represents a sinusoidal wave produced from a referenced oscillator 22. The reference oscillator 22 is arranged to produce the sinusoidal wave which is of about several hundred Hz. A wave form shaping circuit 23 is arranged to change the sinusoidal wave (a) into a square wave of the same frequency. The output (b) of the shaping circuit 23 is supplied to an OR gate OR1. Meanwhile, the sinusoidal wave (a) is also supplied to a frequency step-up element 24. The switches SW3 and SW4 are shifted according to the mode designated by the opertion switch 13. Assuming that the switch SW5 of the operation switch 13 is turned on to designate the standardd reproducing operation mode, the switch SW4 is shifted to one side H thereof. Further, when the switch SW6 is turned on to designate a high speed searching operation mode, the switch SW3 is shifted to the side H thereof and the switch SW4 to the side L thereof. Further, when the switch SW7 is turned on to designate a slow motion reproduing operation mode, both the switches SW3 and SW4 are shifted to their sides L. Assuming that two step-up elements 24 and 25 are both double step-up elements, an input signal to a peak detection circuit 28 disappears when the standard reproducing operation mode is designated; it becomes a sinusoidal wave of frequency four times as high as that of the sinusoidal wave (a) produced from the reference oscillator 22 when the high speed searching operation mode is designated; and it becomes a sinusoidal wave of frequency twice as high as that of the sinusoidal wave (a) when the slow motion reproducing operation mode is designated. A wave form (c) shown in FIG. 7 represents a wave form obtained when the high speed searching reproduction operation mode is designated. At the peak of the input sinusodial wave (c), the peak detection circuit 28 produces trigger pulses (d). The trigger pulses (d) are supplied to the OR gate OR1. The output (e) of the OR gate OR1 is then supplied as a program signal to the switch SW2 of FIG. 3. In short, the program signal (e) corresponds to the standard reproducing operation mode when the valley portion of its square wave does not have any pulse therein; corresponds to the slow motion reproduction operation mode when the valley portion has one pulse; and corresponds to the high speed searching reproducing operation mode when the valley portion has two pulses.

The ordinary reproducing operation of the embodiment without using any mode control signal is as follows: When one of the switches SW11–SW13 of the operation switch 13 is turned on to instruct either the high speed searching reproduction, slow motion reproduction or the standard reproduction, the switch SW10 is off and the switch SW1 is on the side L thereof. Switches SW17–SW20 are all shifted to their sides L. The control signal generator 14 supplies a control signal to each applicable parts of the apparatus according to the mode designated by the operation switch 13.

Thus, even in the case of reproduction without using any mode control signal, it is possible to have a mode control signal recorded by turning on the mode control signal recording instruction switch SW9 to shift the switch SW2 to the side H. Further, even if a mode control signal has already been recorded in that instance, it is possible to record a new mode control signal by erasing the existing record of the track 11 with the erasing head 8. In erasing a recorded mode control signal, the switch SW9 and a switch SW8 which instructs recording of a program signal (a mode control signal) corresponding to quick feeding, i.e. which instructs not to record any program signal, are turned on under this condition respectively.

The control reproduction operation of the embodiment which is to be performed with the mode control signal of the track 11 used is as follows: When the switch SW10 of the operation switch 13 is turned on to instruct control reproduction, the switch SW1 is shifted to the side H. The mode control signal reproduced by the head 7 is supplied to the mode detecting element 31. The mode detecting element 31 produces an output from a terminal 36, 52, 54 or 56 which corresponds to the reproduced mode control signal. Each of the switches SW17–SW20 is on the side H thereof. The output from the terminal 36, 52, 54 or 56 is supplied to the control signal generator 14. The control signal generator 14 then supplies a control signal corresponding to the mode designated by the reproduced mode control signal to the applicable part of the apparatus.

Figure 6:
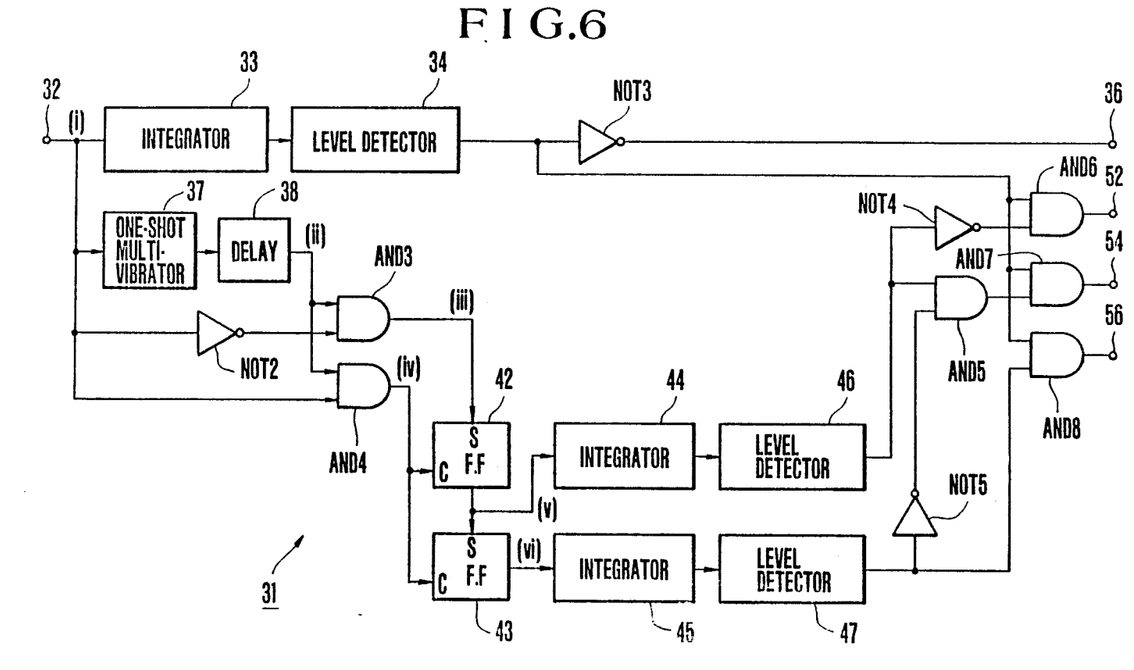
FIG. 6 is a circuit diagram showing by way of example a mode detection element used in the VTR shown in FIG. 3.

Referring now to FIG. 6, the operation of the mode detecting element 31 is as follows: The reproduced mode control signal is supplied to a terminal 32. This input is applied to an integration circuit 33. The output level of the integration circuit 33 is determined by a level detection circuit 34. By this, the circuit 34 determines whether or not a mode control signal is recorded. The level detection circuit 34 produces a high level output when a mode control signal is recorded and a low level output when no mode control signal is recorded. With no mode control signal recorded, a terminal 36 produces a high level output which is obtained via an inverter NOT3. This high level output is supplied to the system control element 15 to bring the apparatus into the quick feeding mode.

Figure 8:
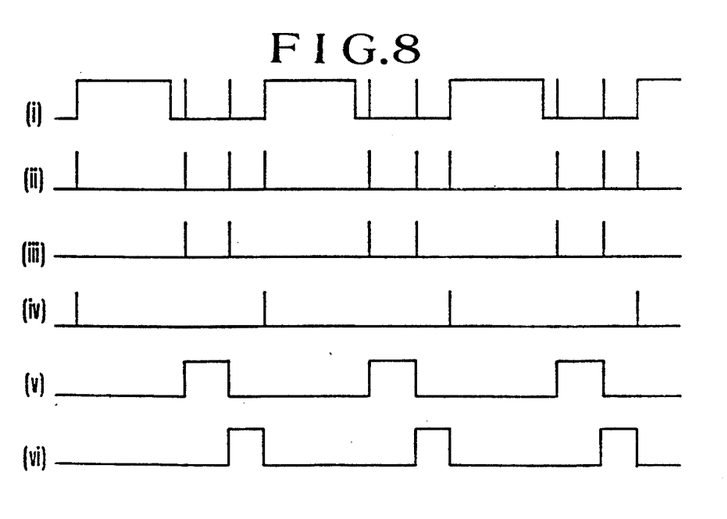

The wave forms of the parts (i)–(vi) of FIG. 6 are as shown in FIG. 8. This drawing represents a case where the mode control signal corresponding to high speed searching reproduction is produced by the mode control signal generation circuit of FIG. 5 and is supplied to a terminal 32. A one-shot monostable multivibrator 37 is triggered by the rise of the input. The output of the multivibrator 37 is supplied to AND gates AND3 and AND4 via a delay circuit 38 which delays the output to a slight degree. Meanwhile, the mode control signal is supplied directly to the AND gate AND4 and is also supplied to the AND gate AND3 via an inverter NOT2. The output of the AND gate AND3 corresponds to the pulses appearing in the valley portion of the square wave of the mode control signal (i) as shown by a part (iii) in FIG. 8. The output of the AND gate AND4 corresponds to the rise of the square wave as shown by a part (iv) of FIG. 8. Thus, the mode corresponding to the mode control signal can be discriminated by detecting the number of the output pulses (iii) of the AND gate AND3 existing between the output pulses (iv) of the AND gate AND4.

FIG. 6 includes flip-flop (hereinafter will be called FF for short) circuits 42 and 43 which form a counter. These FF circuits 42 and 43 receive the output pulses (iii) of the AND gate AND3 as input pulses and the output pulses (iv) of the AND gate AND4 as clear pulses. The output levels of both the FF circuits 42 and 43 are low when there is no output pulse of the AND gate AND3 between the output pulses of the AND gate AND4. The FF circuit 42 alone produces a square wave when there is one output pulse of the AND gate AND3 between the output pulses of the AND gate AND4. Both the FF circuits 42 and 43 produce square waves when there are two or more output pulses of the AND gate AND3 between the output pulses of the AND gate AND4. The outputs of the FF circuits 42 and 43 are supplied via integration circuits 44 and 45 to level detectors 46 and 47 respectively. The level detector 46 produces a high level output when the FF circuit 42 produces the square wave while the level detector 47 produces a high level output when the FF circuit 43 produces the square wave output thereof. The output of another level detector 34 is supplied to each of AND gate AND6, AND7 and AND8. When a mode control signal is recorded, the output of the level detector 34 is at a high level. Accordingly, the output of an inverter NOT4 is produced to a terminal 52, that of the AND gate AND5 to a terminal 54 and that of the level detector 47 to a terminal 56 as they are. In the event that there is no output pulse (iii) of the AND gate AND3 between the output pulses (iv) of the AND gate AND4, the output level of the inverter NOT4 becomes high and a high level output is produced from the terminal 52. This high level output is supplied to the system control element 15, which then brings the apparatus into the standard reproducing operation mode. In case of one pulse (iii) between the pulses (iv), a high level output is produced from the terminal 54; and if the number of the pulses (iii) between the pulses (iv) is two, a high level output is produced from the terminal 56. Then, these outputs respectively result in the slow motion reproducing operation mode and the high speed searching reproduction mode of the apparatus.

As described in the foregoing, the control reproduction of the mode control signals recorded on the tape brings about the following results: The video signal is not reproduced and quick feeding is carried out for a portion of the tape having no mode control signal recorded therein. For a portion of the tape having a mode control signal recorded therein, the video signal is reproduced in a mode corresponding to the mode control signal reproduced from that portion.

With a mode control signal recorded only at a part of the track 11 corresponding to the initial part of a record, for example, if it is desired to see the ensuing part of a specific scene during the process of controlled reproduction, the control reproduction can be negated by turning off the switch SW10 while the video signal of the initial part of the record is being reproduced (in the standard, slow motion or searching mode) and then the ensuing part can be reproduced.

The arrangement described in the foregoing permits recording of mode control signals not only at a part between one record and another but also in other parts, so that desired scenes can be arranged to be promptly reproducible. Further, it is also possible to allow unnecessary part between one record and another to pass during control reproduction.

Further, the reproducing operation mode for control reproduction is also freely selectable. Therefore, the desired scenes can be seen under a desired reproducing operation mode without any additional operation on the apparatus.

In the arrangment of this specific embodiment, the mode control signals are arranged to be recorded and reproduced by means of the head 7. However, different heads may be arranged to be used for recording and reproduction of the mode control signals.

In the arrangement shown in FIG. 1, a quick feeding operation is carried out with the magnetic tape 1 in the loading condition being wound on the drum 2. However, the quick feeding opertion can be carried out with the magnetic tape 1 in any condition other than the loading condition so long as the tape 1 comes in contact with the head 7.

Figure 9:
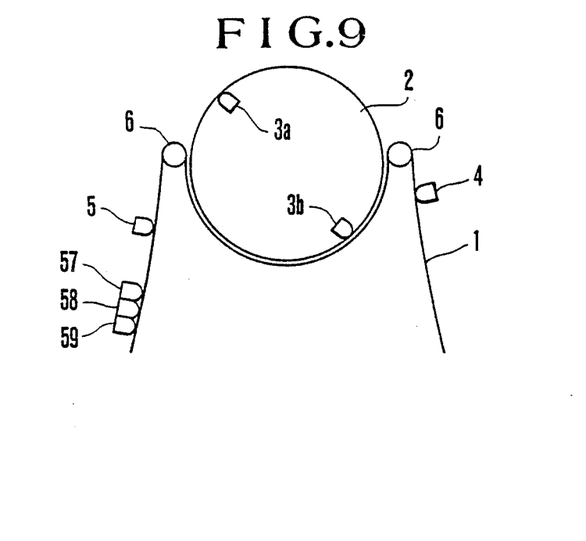
FIG. 9 is an illustration schematically showing a tape transport system of a VTR as another embodiment example of the invention.
Figure 10:
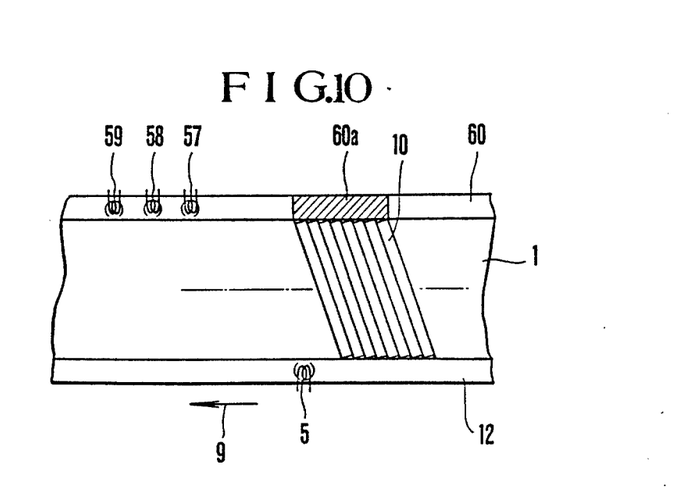
FIG. 10 is an illustration schematically showing recording loci drawn on a magnetic tape by the VTR arranged as another embodiment example of the invention.
Figure 11:
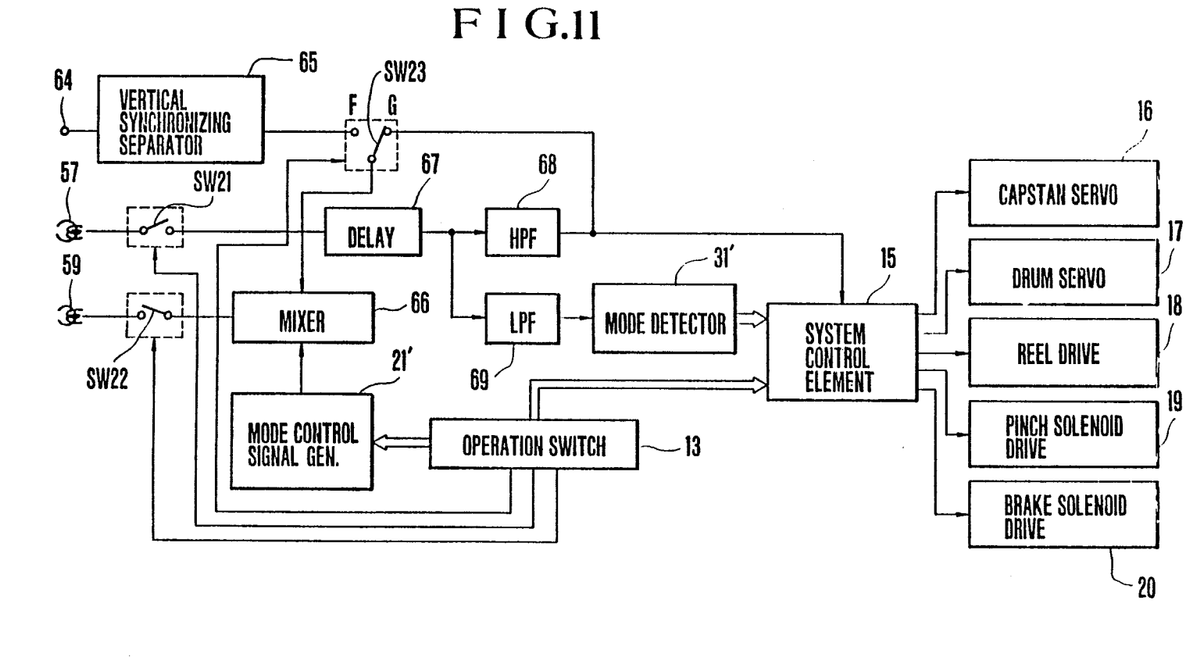
FIG. 11 is a block diagram showing the basic arrangement of the VTR arranged as another embodiment of the invention.

FIG. 9 shows by way of example the tape transport system of a VTR according to the present invention as another embodiment example thereof. FIG. 10 shows a recording pattern to be drawn on a magnetic tape by the embodiment. The VTR is arranged as shown in FIG. 11. In these drawings, the same parts as those shown in FIGS. 1–3 are indicated by the same reference numerals as in FIGS. 1–3.

In this embodiment, the invention is applied to a VTR of the type wherein, in recording a video signal, the vertical synchronizing signal of the video signal to be recorded is separated; the signal thus obtained is recorded in the longitudinal direction of the tape; and, during reproduction, this signal is utilized as a servo control signal (hereinafter will be called the signal CTL) for control over the rotation of the drum or the travel of the tape. The embodiment is arranged to have a signal which is obtained by mixing the signal CTL with a mode control signal (hereinafter will be called the mixed signal) recorded in a mixed signal recording track 60 provided for recording the mixed signal.

Referring to FIG. 9, the embodiment includes a mixed signal reproducing head 57 which is arranged to reproduce the mixed signal; a mixed signal erasing head 58 which is arranged to erase the mixed signal track 60; and a mixed signal recording head 59 which is arranged to record the mixed signal.

In recording a video signal alone, the embodiment operates as follows: When recording the video signal alone is instructed by means of the operation switch 13, a switch SW21 turns off; a switch SW22 turns on; and a switch SW23 is shifted to one side F thereof as shown in FIG. 11. Referring to FIG. 11, a video signal to be recorded is supplied to a terminal 64. A vertical synchronizing signal which is separated from this video signal by a vertical synchronizing signal separating circuit 65 is supplied via the switch 23 to a mixer 66. At that time, no program signal (mode control signal), is produced from a program (or mode control), signal generator 21'. Therefore, the separated vertical synchronizing signal alone is supplied to the mixed signal recording head 59 to be recorded in the track 60 as a servo control signal. In the meantime, the recording and reproducing heads 3a and 3b record the video signal thus forming oblique tracks 10 on the tape.

In recording both a video signal and a mode control signal, the embodiment operates as follows: When recording the mode control signal is instructed by means of the operation switch 13, the output of the mode control signal generator 21' (or the program signal generator 21') is supplied to the mixer 66. In this instance, the mode control signal generator consists of a reference oscillator and a variable amplifier. A sinusoidal wave signal of about 30 Hz is used as a program signal. The correspondence between the program signal (or the mode control signal) and each opertion mode is obtained by arranging the recording level of th sinusoidal wave to correspond to each of the operation modes. More specifically, the variable amplifier is arranged, for example, to have three stepwise degrees of amplification to give three different recording levels. The highest level is arranged to correspond to the high speed searching reproduction mode; the intermediate level to correspond to the slow motion reproduction; and the lowest level to correspond to the standard reproduction mode. The mode control signal which is obtained in this manner is mixed with the servo control signal at the mixer 66. The mixed signal thus obtained is recorded in the track 60 by the head 59.

Let us now consider an instance where a mode control signal, or the mixed signal in this specific embodiment, is to be rewritten alone. When reproduction is being performed at the standard speed, the switch SW21 is on. A reproduced mixed signal reproduced by the mixed signal reproducing head 28 is delayed by a delay circuit 67 as much as a time axial difference between the heads 57 and 59 for standard recording and reproduction. The delayed mixed signal is supplied to a high-pass filter 68 (hereinafter will be called HPF for short) and a low-pass filter 69. The servo control signal is separated by the HPF 68 and the mode control signal by the LPF 69 respectively. The servo control signal separated by the HPF 68 is supplied to the system control element 15 and is used by a capstan servo circuit 16 or a drum servo circuit 17 as a reference signal.

When reproduction is performed without using any mode control signal is this manner, the system control element 15 controls each applicable part of the apparatus in response to the instruction signal from the operation switch 13 not only for standard reproduction but also for slow motion reproduction and high speed searching reproduction. Under this condition, when an instruction for rewriting the mode control signal is produced, the switch SW22 is turned on. Then, the switch 23 is shifted to the side F thereof which is shown in FIG. 6. This causes the servo control signal which is delayed by the delay circuit 45 to be supplied to the mixer 66. A new mode control signal is then supplied to the mixer as another input. In the event that the mode control signal is to be cancelled, this can be effected by causing the mode control signal generator 21' not to produce any output therefrom. The mixed signal reproducing head 57 then reproduces the mixed signal. The mixed signal track 60 is erased by the mixed signal erasing head 58 and a new mixed signal is recorded by the mixed signal recording head 59, so that the mode control signal alone can be rewritten in this manner.

With the embodiment arranged as shown in FIG. 10, the operation of the embodiment for control reproduction is as follows: In this case, the switch SW21 is on and the switch SW22 off. The mixed signal which is delayed by the delay circuit 67 is divided into a mode control signal and a servo control signal through the HPF 68 and the LPF 69. The level of the mode control signal is detected by the mode detection element 31' and the mode to which the mode control signal corresponds is thus detected. The datum on the mode detected by the mode detection element 31' is supplied to the system control element 15. The whole apparatus is then controlled in this mode.

The embodiment shown in FIGS. 9-11 thus gives the same effects as the preceding embodiment example shown in FIGS 1-3. Further, the arrangement of this embodiment obviates the necessity of providing any additional track for the program signal (the mode control signal). This arrangement thus gives interchangeability with the conventional VTR's.

Figure 12:
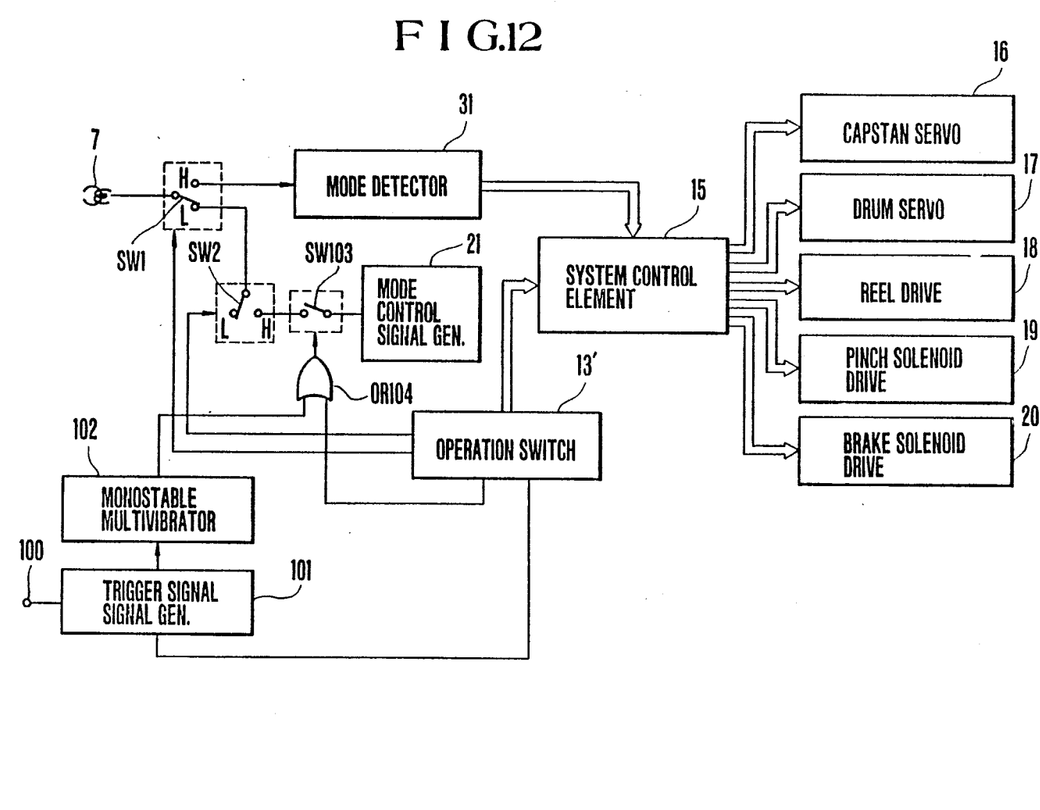
FIG. 12 is a block diagram showing the basic arrangement of a VTR as a further embodiment example of the invention.
Figure 13:
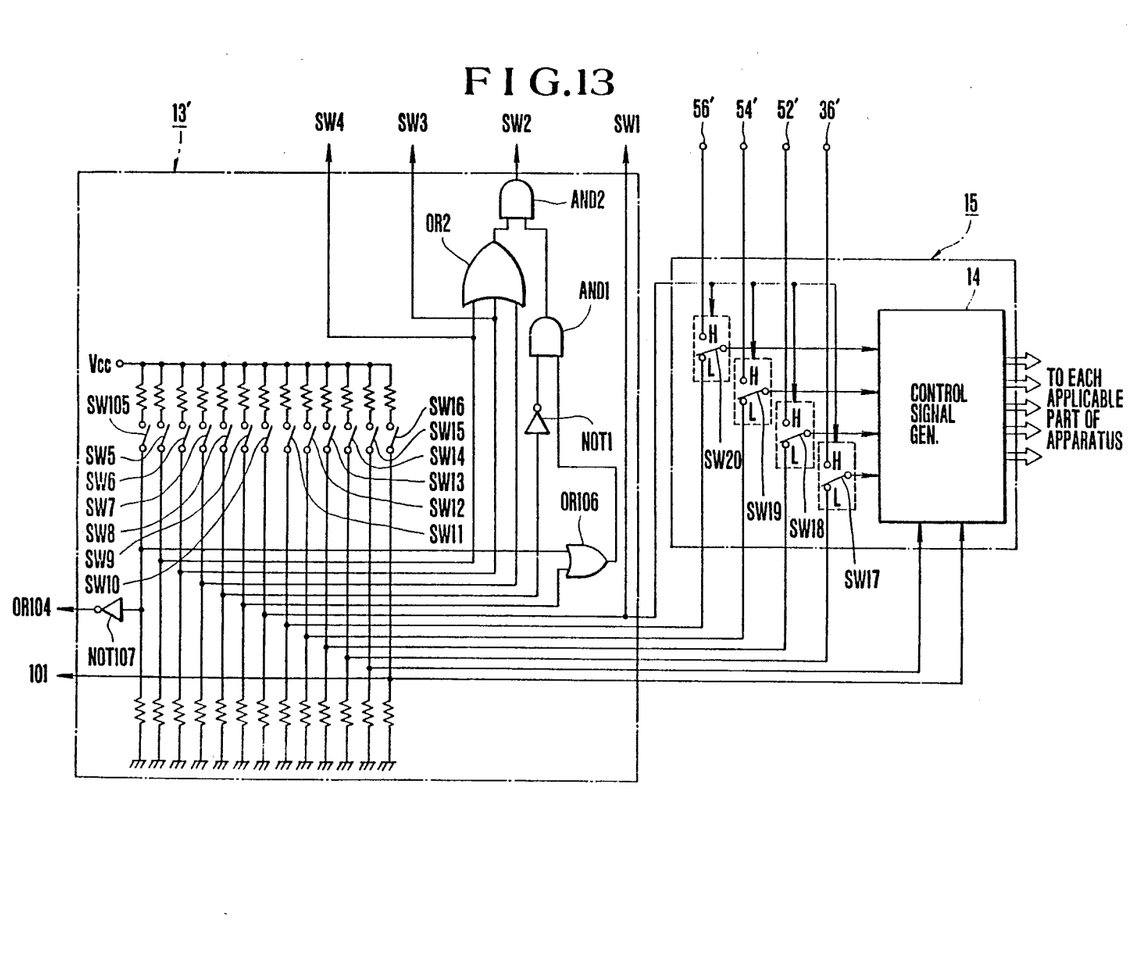
FIG. 13 is a circuit diagram showing by way of example the operation switch and the system control element of the VTR shown in FIG. 12.

FIG. 12 shows the basic arrangement of a VTR as a further embodiment example of this invention. FIG. 13 shows by way of example the arrangement of the operation switch 13' and the system control element 15 of the embodiment shown in FIG. 12. In FIG. 12, the components similar to those shown in FIG. 3 are indicated by the same reference numerals as in FIG. 3 and description of them is omitted from the following description. Further, in FIG. 13, the parts similar to the parts shown in FIG. 4 are also indicated by the same reference numerals and the description of them is also omitted here.

Referring to FIG. 13, the operation switch 13' includes a switch SW105 which is provided for enabling the apparatus to record a search-out mode control signal. When this switch SW105 is off, an inverter NOT107 constantly produces a high level output. Under this condition, an OR gate OR104 shown in FIG. 12 produces a high level output and a switch SW103 is on. Accordingly, under this condition, the circuit arrangement of FIG. 12 operates in the same manner as the embodiment shown in FIG. 3.

Next, when the switch SW105 is turned on, an operation to record a program signal for searching is performed in the following manner: With the instruction switch SW105 for the search-out program signal turned on, an OR gate OR106 produces a high level output in the same manner as when the switch SW9 is turned on. Then, if any of the switches SW5-SW7 is on at that time, the switch SW2 is shifted to the side H. Meanwhile, an inverter NOT107 produces a low level output to allow the OR gate OR104 to pass the output of a monostable multivibrator 102 as it is. In other words, the switch SW103 which has been constantly on comes to be operated by the output of the monostable multivibrator 102. There is provided a terminal 100 for receiving information on the start of recording from a video camera which is not shown. This information causes a trigger signal generating circuit 101 to produce a pulse in response to recording start information from the switch SW9. This pulse triggers the monostable multivibrator 102. The output of the monostable multivibrator 102 is then kept at a high level for a predetermined period of time after receipt of the pulse from the trigger signal generating circuit 101 (several seconds for example). In this manner, a mode control signal is recorded in a position which corresponds to a predetermined length of a video signal portion for the initial part of a scene. This mode control signal can be any signal that corresponds to any mode other than the quick feeding mode.

The arrangement described above permits automatic recording of a mode control signal which corresponds to a predetermined length of a video signal at the initial part of each record. The embodiment, therefore, enables the operator to save time for writing in a mode control signal. When, for example, a magnetic tape having the mode control signal which corresponds to the predetermined length of a video signal solely recorded at the initial part of each record is subjected to a control reproducing operation, the scene of the initial part of each record is reproduced for several seconds and then the tape is quickly fed to have the initial part of a next record. Therefore, the initial parts of desired records can be very quickly taken out even in the case of a tape of very long recording time.

When the VTR described above is used for unattended recording of TV broadcast, the record thus obtained tends to include some unwanted part such as commercial messages. In such a case, if the mode control signal corresponding to standard reproduction is recorded at all parts of the record except the unwanted part, only the desired parts of the record can be reproduced in a controlled reproducing manner while quick feeding is performed for the undesired part. The use of the mode control signal thus gives various advantages in addition to the search for the initial part of a desired record.

In the embodiment described above, the servo control signal and the mode control signal are mixed together and the mixed signal thus obtained is recorded in a part of a magnetic tape usually used as a servo control signal recording track. However, in place of such arrangement, the mode control signal may be arranged to be mixed with either an audio signal or a video signal. In the case of mixing it with an audio signal, for example, the mode control signal may be inserted in a lower zone than is bias signal. In mixing it with a video signal, an encoded mode control signal may be inserted in a horizontal or vertical blanking range.

In the embodiments described, the invention is applied to VTR's. However, this invention is not limited to such applications but is of course also applicable to information recording and reproducing apparatuses of other kinds such as an ordinary audio tape recorder, etc.

As described in the foregoing, in accordance with this invention, desired information alone can be promptly reproduced in a desired reproducing operation mode.

What we claim:

1. A video tape recorder, comprising:
  (a) first recording means including at least one rotary head for recording a video signal on a first area of a magnetic tape;
  (b) first reproducing means including at least one rotating head for reproducing the video signal from the first area of the magnetic tape;
  (c) moving means for moving the magnetic tape in its lengthwise direction;
  (d) manually operable means for designating a mode of the video tape recorder among a plurality of modes, said plurality of modes including a recording mode, a normal reproduction mode, a searching reproduction mode, and a quick feeding mode;
  (e) second recording means including at least one fixed head for recording a mark signal on the second area of the magnetic tape, said fixed head recording said mark signal on the second area of the tape for a specific period in response to a specific manual operation for designating the recording mode of said manually operable means;
  (f) second reproducing means for reproducing the mark signal from the second area of the tape;
  (g) mode cotnrol means for changing over the video tape recorder among said plurality of modes in response to manual operations of said manually operable means and said mark signal reproduced by said reproducing means, said mode control means being arranged to be able to bring the recorder into the searching reproduction mode only for a predetermined period in response to the reproduction of the mark signal being started by said second reproducing means and to maintain the recorder in the quick feeding mode for periods other than said predetermined period;

wherein when the recorder is in the recording mode, said first recording means records the video signal and said moving means moves the tape at a first speed, when the recorder is in the reproducing mode, said first reproducing means reproduces the video signal and said moving means moves the tape at said first speed;

when the recorder is in the searching reproduction mode, said first reproducing means reproduces the video signal and said moving means moves the tape at a second speed faster than said first speed, and when the recorder is in the quick feeding mode, said first reproducing means does not reproduce the video signal and said moving means moves the tape at a third speed faster than said first speed.

2. A recorder according to claim 1, wherein:

said plurality of modes further includes a slow motion reproduction;

wherein when the recorder is in the slow motion reproduction mode, said first reproducing means reproduces the video signal and said moving means moves the tape at a fourth speed slower than said first speed.

3. A recorder according to claim 2, wherein:

said mode control means is arranged to be able to bring the recorder into the slow motion reproduction mode only for a predetermined period in response to the reproduction of the mark signal being started by said second reproducing means and to maintain the recorder in the quick feeding mode for periods other than said predetermined period.

* * * * *